METHOD OF PREPARING LEAD TITANATE FERROELECTRIC CERAMICS

Filed Jan. 15, 1963 3 Sheets-Sheet 1

INVENTORS
HANS JAFFE
ROBERT GERSON
BY *William J. Flynn*
ATTORNEY

METHOD OF PREPARING LEAD TITANATE FERROELECTRIC CERAMICS

Filed Jan. 15, 1963 3 Sheets-Sheet 2

INVENTORS
HANS JAFFE
ROBERT GERSON
BY William J. Flynn
ATTORNEY

METHOD OF PREPARING LEAD TITANATE FERROELECTRIC CERAMICS

Filed Jan. 15, 1963

3 Sheets-Sheet 3

INVENTORS
HANS JAFFE
ROBERT GERSON
BY William J. Flynn
ATTORNEY

United States Patent Office 3,216,943
Patented Nov. 9, 1965

3,216,943

METHOD OF PREPARING LEAD TITANATE FERROELECTRIC CERAMICS

Hans Jaffe, Cleveland Heights, Ohio, and Robert Gerson, Rolla, Mo., assignors to Clevite Corporation, a corporation of Ohio Filed Jan. 15, 1963, Ser. No. 251,597
10 Claims. (Cl. 252—62.9)

This invention relates to a method of preparing lead titanate ferroelectric ceramics having electromechanical transducing properties.

The ceramics to which the present invention pertains are polycrystalline aggregates fired to ceramic maturity and thereafter polarized, or capable of being polarized, to impart thereto electromechanical transducing properties similar to the well-known piezoelectric effect. Such ceramics may be embodied in transducers for producing, sensing and/or measuring sound, shock, vibration, pressures, and for various other applications, such as electromechanical wave filters.

A ceramic of principal importance for such applications is lead zirconate titanate, which is a polycrystalline material composed principally of $PbZrO_3$ and $PbTiO_3$ effectively in solid solution. Compositions of this general type and their properties are disclosed in U.S. Letters Patent No. 2,708,244 to Bernard Jaffe.

In addition to lead zirconate titanate, other ferroelectric ceramic materials of interest for various electromechanical transducer applications are lead titanate-lead stannate, and the ternary system lead zirconate-lead titante-lead stannate, as disclosed in U.S. Letters Patent No. 2,849,404 to Jaffe et al. in National Bureau of Standards Report No. 3684 (Jaffe, Roth and Marzullo, Report No. 9, October 1, 1954), and in the article in Journal of Research of the National Bureau of Standards, vol. 55, No. 5, November, 1955, pp. 239–254, entitled "Properties of Piezoelectric Ceramics in the Solid-Solution Series Lead Titanate-Lead Zirconate-Lead Oxide: Tin Oxide and Lead Titanate-Lead Hafnate."

Certain properties of these ceramic materials have been improved by the addition of other elements in small amounts. For example, as disclosed in U.S. Letters Patent No. 3,006,857 to Kulcsar, the addition of a small amount of chromium or uranium to lead zirconate titanate greatly enhances the properties desired for electromechanical wave filter applications. As other examples, the addition of a small amount of strontium or calcium to lead zirconate titanate or lead titanate-lead stannate or lead zirconate-lead titanate-lead stannate increases its dielectric constant, as disclosed in United States Letters Patent No. 2,906,710 to Kulcsar and Jaffe, and a similar result is obtained by the addition of barium, as disclosed in the copending U.S. Patent application of Kulcsar and Jaffe, Serial No. 151,847, filed November 13, 1961, and assigned to the same assignee as the present invention.

In accordance with the present invention, desirable properties of these ferroelectric ceramic materials are improved by firing the material in an oxygen-deficient atmosphere. By "oxygen-deficient atmosphere" is meant an atmosphere containing substantially less oxygen than air under normal atmospheric pressure. Desirably, the oxygen-deficient atmosphere consists essentially of an atmosphere of nitrogen or argon constituting an unreactive carrier gas in which ceramic firing is carried out.

It is an object of this invention to provide a novel method of preparing a lead titanate ferroelectric ceramic which improves properties of the latter which are important to its use in electromechanical transducers.

Another object of this invention is to provide a novel method of preparing a lead titanate ferroelectric ceramic, modified by the partial substitution of chromium for lead, which improves the ceramic's performance under high electrical or mechanical drive or bias.

Another object of this invention is to provide a novel method of preparing a lead titanate ferroelectric ceramic, modified by the partial substitution of chromium for lead, which improves the ceramic's linearity under different excitation field levels, particularly high levels.

Another object of this invention is to provide a novel method of preparing a lead titanate ferroelectric ceramic, modified by the partial substitution of chromium for lead, which substantially increases the ceramic's resistivity.

Another object of this invention is to provide a novel method of preparing a lead titanate ferroelectric ceramic, modified by the partial substitution of chromium for lead, which substantially reduces the ceramic's dissipation factor.

Another object of this invention is to provide a novel method of preparing a lead titanate ferroelectric ceramic, modified by the partial substitution of chromium for lead, which improves the stability of its dielectric constant under different D.C. biases.

A further object of this invention is to provide a novel method of preparing a lead titanate ferroelectric ceramic, modified by the substitution for lead of one or more of the alkaline earth metals, strontium, calcium and barium, which increases its resistivity.

A still further object of this invention is to provide a novel method of preparing a lead titanate ferroelectric ceramic, modified by the substitution for lead of one or more of the alkaline earth metals, strontium, calcium and barium, which enables the material to be poled using a relatively high poling temperature and a relatively low intensity poling field, thereby making possible the poling of substantially thicker bodies of this material than was feasible heretofore.

Further objects and advantages of this invention will be apparent from the following detailed description of certain presently-preferred embodiments thereof, described with reference to the accompanying drawings.

Figure 1:
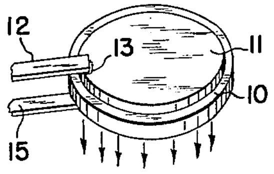
FIGURE 1 is a perspective view of an electromechanical transducer whose active element may be prepared by the method of the present invention.
Figure 2:
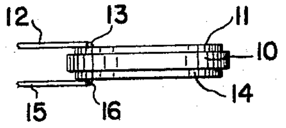
FIGURE 2 is an elevational view of the FIGURE 1 transducer.

Before proceeding with a description of the method of the present invention, reference is made first to FIGURES 1 and 2 which illustrate an electromechanical transducer which may incorporate ceramic material produced by the present method. In the particular embodiment shown, the transducer has as its active element a disc-shaped body 10 of the ceramic material. The body 10, after being electrostatically polarized, is provided with a pair of electrodes 11 and 14 applied to its opposite major faces. Leads 12 and 15 are conductively attached by solder 13 and 16, respectively, to the electrodes 11 and 14. These leads may be used to connect the transducer in the electrical circuit (not shown) in which the transducer is to operate.

As is well understood, an electromechanical transducer, such as the particular device shown in FIGURES 1 and 2, converts applied electrical energy to mechanical energy, and vice versa. A voltage applied across the electrodes 11 and 14 produces a strain or mechanical deformation of the ceramic body 10. In the particular arrangement shown, the transducer is adapted to emit sound waves in the direction shown by the arrows in FIG. 1 into an appropriate external medium, which may be solid, liquid or gaseous. Conversely, if the ceramic body 10 is subjected to mechanical stress, the resulting strain generates an electrical output voltage across the electrodes 11 and 14.

The ceramic body 10 is a polycrystalline ceramic composed principally of a solid solution of lead titanate and either lead zirconate or lead stannate, or both. Preferably, the body also contains one or more other elements substituting in part for the lead of the lead titanate and zirconate and/or stannate. The lead compounds will be termed the principal constituents or basic compositions, and the substituent elements will be referred to as additions.

The basic compositions fall into three categories: (1) those belonging to the binary system lead zirconate-lead titanate; (2) those belonging to the binary system lead stannate-lead titanate; and (3) those belonging to the ternary system lead zirconate-lead stannate-lead titanate. The designations binary and ternary are used in conjunction with the base materials and in disregard of the additions.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium.

Figures 3, 4, 9, 10:
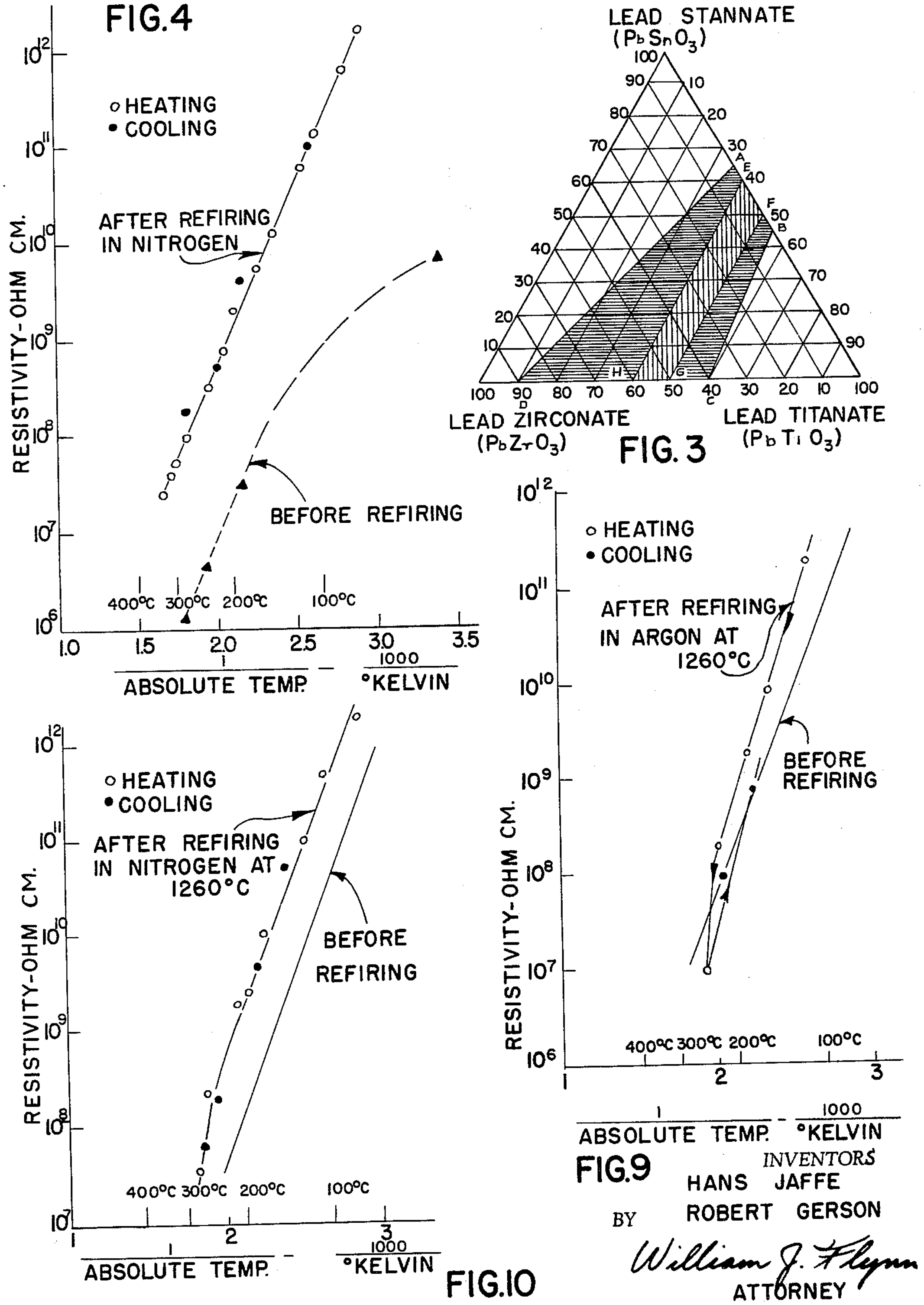
FIGURE 3 is a triangular compositional diagram of ceramic material used in the present method.
FIGURE 4 is a graphic representation showing the effects of the present method on the resistivity vs. temperature characteristic of chromium-modified lead zirconate titanate.
FIGURE 9 is a graphic representation showing the resistivity vs. temperature characteristic of strontium-modified lead zirconate titanate before and after refiring in argon in accordance with the present process.
FIGURE 10 is a similar view showing the same characteristic of that material before and after refiring in nitrogen in accordance with the present process.

All possible compositions coming within all three of the systems defined above are represented by the triangular diagram constituting FIGURE 3 of the drawings. All compositions represented by the diagram, however, are not ferroelectric, and many are electromechanically active only to a very slight degree. The present invention is concerned only with those compositions exhibiting piezoelectric response of appreciable magnitude. As a matter of convenience, the radial coupling, $k_r$ (also known as planar coupling $k_p$ and disc coupling $k_{disc}$), of test discs will be taken as a measure of piezoelectric activity.

Thus, within the horizontally hatched area bounded by lines connecting points ABCD, FIGURE 3, all compositions polarized and tested showed a radial coupling of at least 10%. The area bounded by ABCD includes binary lead zirconate-lead titanate solid solutions lying on the line DC along which the mol ratio ($PbZrO_3$:$PbTiO_3$) of the end components varies from 90:10 to 40:60. Among these base line compositions those falling between points H and G have characteristically higher radial couplings with the highest couplings occurring where the $PbZrO_3$:$PbTiO_3$ ratio is around 53:47 or 54:46 in the absence of additions.

The binary compositions on line AB ($PbSnO_3$:$PbTiO_3$ from 65:35 to 45:55) of the FIGURE 3 diagram are similar to those on line DC in structure but are characterized by generally lower radial couplings with the best couplings occurring in compositions falling between points E and F, i.e., with the mol ratio $PbSnO_3$:$PbTiO_3$ in the range 60:40 to 50:50.

In the ternary compositions within the area designated ABCD, the inclusion of $PbSnO_3$ as a substituent for a portion of the $PbZrO_3$ in the base line compositions has the effect of progressively lowering the Curie temperature but the compositions retain a relatively high radial coupling, particularly in the area of the diagram bounded by lines connecting points EFGH.

*Example 1*

In this example the basic composition is lead zirconate titanate containing, as an addition, chromium. Preferably, the chromium is added in the form of $Cr_2O_3$ by the technique described in detail in the previously-mentioned U.S. Letters Patent, No. 3,006,857. The amount of chromium in the ceramic material may be varied within certain limits to enhance specific desired properties of the ceramic. Preferably the chromium is present in an amount corresponding to the range from about 0.3% to 1.0% by weight of $Cr_2O_3$ added to the lead zirconate titanate, with the optimum being substantially 0.7%.

In accordance with a preferred embodiment of the present method, this chromium-modified lead zirconate titanate is first processed as disclosed in the aforementioned U.S. Patent No. 3,006,857 and is fired in air at a suitable ceramic-firing temperature. Thereafter, in accordance with the present invention, the previously air-fired ceramic body is fired again in an oxygen-deficient atmosphere. Preferably, this oxygen-deficient atmosphere consists substantially entirely of nitrogen gas or argon gas, each of which is substantially completely unreactive with the ceramic. The temperature during this oxygen-deficient re-firing operation preferably is maintained within the range of 1100° C. to 1260° C. for about one hour.

In the starting materials for the ceramic, substantially the entire lead content is lead oxide, PbO, providing just sufficient oxygen for two-valent lead compounds and insuring that an oxygen-deficient atmosphere may be maintained in the final firing. That is, none of the starting materials of the ceramic, particularly the lead oxide, is itself so oxygen rich as to prevent the establishment of an oxygen-deficient atmosphere in the immediate vicinity of the ceramic during the final firing.

One of the advantageous results of this novel treatment of chromium-modified lead zirconate titanate is a very substantial increase in resistivity of this material. FIGURE 4 shows the resistivity in ohm centimeters plotted against the reciprocal of the absolute temperature in degrees Kelvin for previously air-fired, chromium-modified, lead zirconate titanate before and after being re-fired in a nitrogen atmosphere, as described. This sample had chromium added in an amount corresponding to 0.7% by weight of $Cr_2O_3$ added to the lead zirconate titanate. It will be noted that the resistivity is particularly increased at temperatures below about 100° C. as a consequence of this novel procedure.

Another advantageous result of the present method is that the dissipation factor of the chromium-modified lead zirconate titanate is substantially reduced over what it is for air-fired chromium-modified lead zirconate titanate in the absence of such treatment.

Another advantageous result of the present process, as applied to chromium-modified lead zirconate titanate is that the mechanical Q of the ceramic is very greatly increased, usually by a factor of about 3. Values of mechanical Q up to about 1500 have been obtained by firing chromium-modified lead zirconate titanate in an oxygen-deficient atmosphere in accordance with the present invention.

Figure 5:
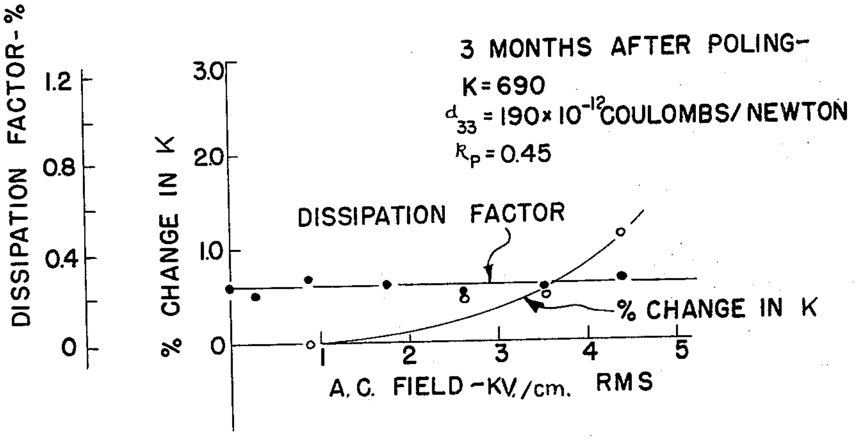
FIGURE 5 is a graphic representation showing the effects of increasing A.C. excitation field on the dissipation factor and the dielectric constant (K) of a typical sample of chromium-modified lead zirconate titanate prepared by the present method.

The most remarkable and advantageous improvement achieved by the present method, as applied to chromium-modified lead zirconate titanate, is its improved linearity when excited at different field intensities up to relatively high amplitude fields. FIGURE 5 shows a plot of dissipation factor (in percent) versus A.C. excitation field and the percentage change in the dielectric constant (K) versus A.C. excitation field for a sample of chromium-modified lead zirconate titanate which has been re-fired in a nitrogen atmosphere, as described hereinbefore. This sample had a chromium concentration corresponding to 0.7% by weight of $Cr_2O_3$ added to the lead zirconate titanate. The dissipation factor remains virtually constant at different excitation field amplitudes. The percentage change in the dielectric constant also is remarkably low, and much lower than has been obtained previously by any additions to, or other treatment of, lead zirconate titanate. Since these properties do not change excessively under high electrical or mechanical drive or bias, the chromium-modified lead zirconate titanate produced by this method is particularly well suited for use in high power transducers and in other applications where mechanical and electrical losses must be low.

Figure 7:
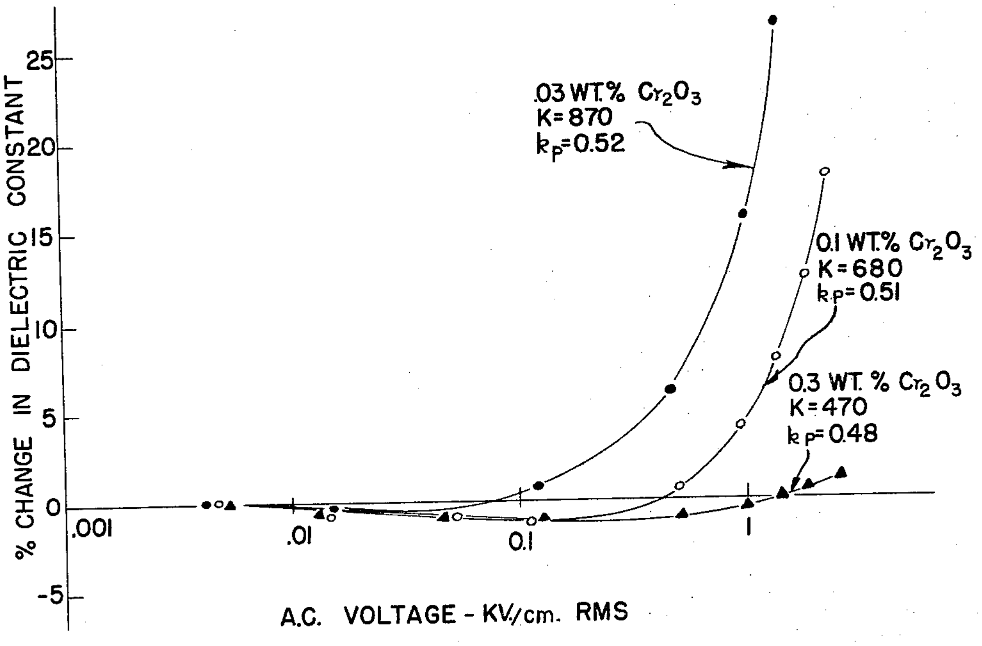
FIGURE 7 is a graphic representation showing the effect of different chromium concentrations in lead zirconate titanate, prepared in an oxygen-deficient atmosphere in accordance with the present process, on the dielectric constant vs. A.C. excitation field characteristics of the material at high field levels.
Figure 8:
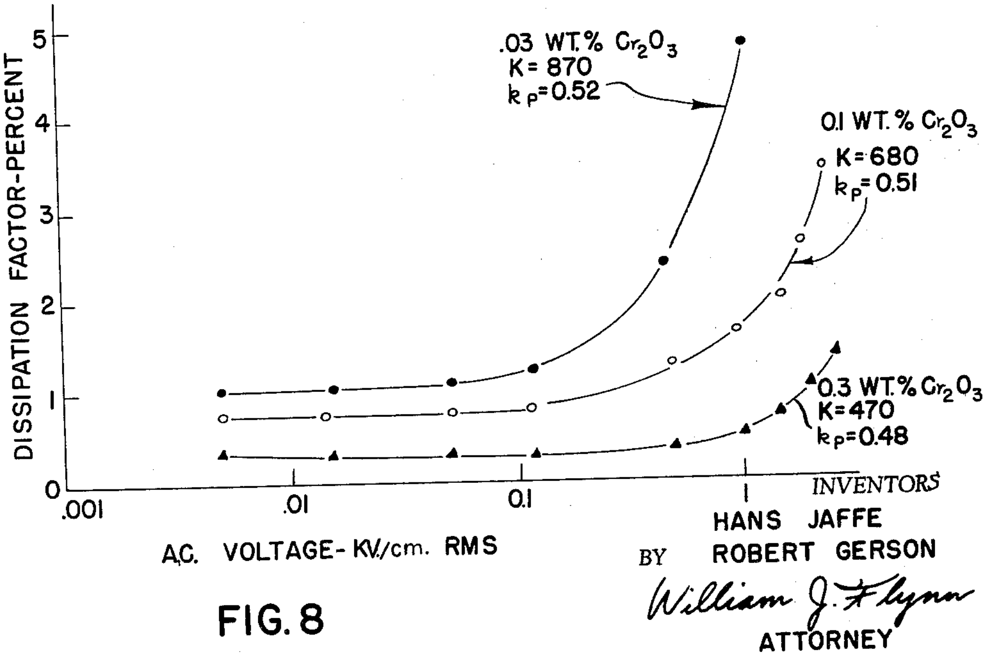
FIGURE 8 is a similar view showing the effect of different chromium concentrations in lead zirconate titanate prepared in an oxygen-deficient atmosphere in accordance with the present process, on the dissipation factor vs. A.C. excitation field characteristics of the material at high field levels.

FIGURES 7 and 8 show the influence of chromium on the dielectric constant stability and the dissipation factor of chromium-modified lead zirconate titanate prepared by the present process.

As shown in FIG. 7, the dielectric constant becomes more stable under high excitation fields as the chromium addition is increased. Substantial stability of the dielectric constant is obtained when the chromium is added in an amount corresponding to 0.3 weight percent of $Cr_2O_3$, and this value is considered to define the lower end of the preferred range of the chromium concentration in lead zirconate titanate. The value of K decreases as the chromium addition is increased.

Both FIGURES 7 and 8 were taken for chromium-modified lead zirconate titanate only one day after poling. Better results, particularly lower losses, are obtained as the material ages.

The mechanical Q of the chromium-modified lead zirconate titanate prepared by the present method increases with increasing chromium content, which is another factor making it desirable to have chromium added in an amount at least corresponding to 0.3 weight percent of $Cr_2O_3$.

Figure 6:
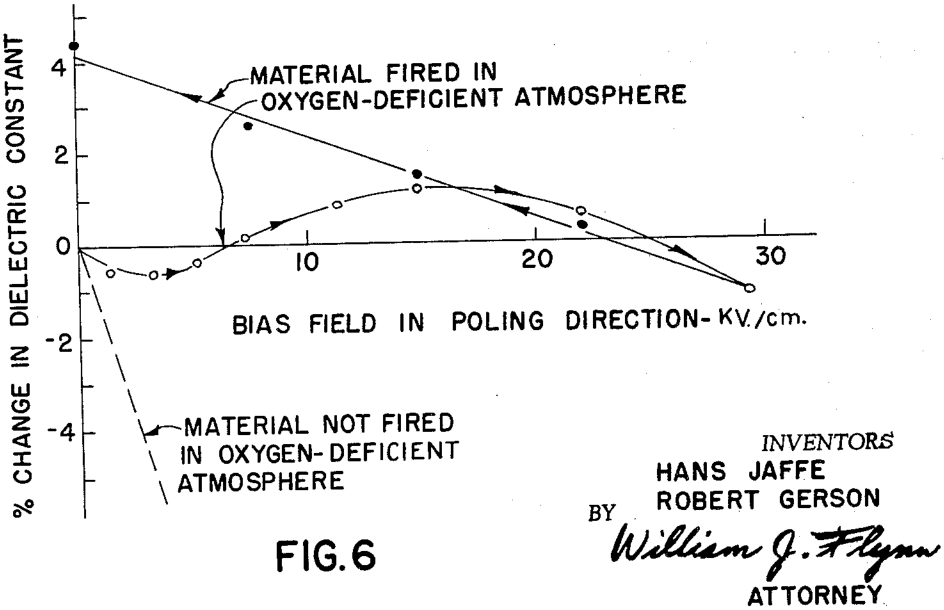
FIGURE 6 is a graphic representation showing the effect of the present method on the dielectric constant vs. D.C. bias characteristic of chromium-modified lead zirconate titanate.

Also, chromium-modified lead zirconate titanate treated by the present method exhibits improved stability of its dielectric constant with changing D.C. bias. FIGURE 6 shows a plot of percentage change in dielectric constant (K) versus D.C. bias for a particular sample of chromium-modified lead zirconate titanate which has been re-fired in a nitrogen atmosphere subsequent to being air-fired, as well as a plot of the same factors for a similar sample of chromium-modified lead zirconate titanate which has been air-fired but not subsequently refired in an oxygen-deficient atmosphere. In both of these samples the chromium addition corresponded to 0.7 weight percent of $Cr_2O_3$ added to the lead zirconate titanate.

While, in the preferred embodiment of the present method the firing in an oxygen-deficient atmosphere is done after the ceramic has been fired in air, similar improvement in the ceramic's properties are obtained if the air-firing step is omitted. However, the density of the ceramic will be reduced by this omission, so that it is preferable to include the air-firing step. In either case, the starting materials for the ceramic should include lead oxide, PbO, but substantially no $Pb_3O_4$, because the latter's oxygen-rich nature is inconsistent with the maintenance of an oxygen-deficient atmosphere in the immediate vicinity of the ceramic during the final firing.

*Example 2*

In this example, the basic composition is lead zirconate titanate, modified by the addition of one or more of the alkaline earth metals, strontium, calcium and barium. The replacement of a fraction of the lead in the ceramic by strontium, calcium or barium improves certain of the ceramic's properties, particularly by providing a higher and more uniform dielectric constant.

In one particular example, the ceramic has strontium added and has the composition $Pb_{.95}Sr_{.05}Zr_{.53}Ti_{.47}O_3$. Because strontium has a normal valency of +2, the strontia addition to lead zirconate titanate is believed to cause a minimum disturbance of the host lattice and not to have a great effect on the electronic state of lead zirconate titanate.

In accordance with the present invention, this ceramic, after being prepared in the usual way and fired in air, is refired in an argon or nitrogen atmosphere at 1260° C. for about one hour. In the starting materials for the ceramic, substantially all of the lead is in the form of lead oxide, PbO, and substantially no $Pb_3O_4$ is present for the reason already stated.

If desired, the air firing step may be omitted, in which case the ceramic may be fired to maturity just once, in an oxygen-deficient atmosphere. However, preferably the oxygen-deficient firing is preceded by air firing of the ceramic.

This novel oxygen-deficient firing treatment increases significantly and resistivity of the strontium-modified lead zirconate titanate, as shown by the curves in FIGURES 9 and 10. FIGURE 9 is for re-firing in argon and FIGURE 10 for nitrogen. The increase in resistivity is greatest at lower temperatures, particularly around 100° C.

This increased resistivity offers certain advantages in poling the ceramics. Previously, in poling air-fired alkaline earth-modified lead zirconate titanate, one was limited to low temperatures (well below 200° C.) during poling because of the ceramic's electrical conductivity. To achieve adequate poling at such temperatures it was necessary to use relatively high poling fields. However, with the increased resistivity provided by refiring the ceramic in an oxygen-deficient atmosphere in accordance with the present invention, poling may be done at a much higher temperature and with a lower poling field. Losses due to dielectric break-down can be minimized by this method, particularly for thick ceramic bodies. The poling temperature in accordance with the present invention is in excess of 200° C., and below the Curie point temperature. Preferably, the poling temperature is substantially within the range of 200° C. to 240° C. A poling field of 10 kv./cm. applied to the material at this temperature yielded almost the maximum possible coupling from the material. The poling medium used was silicone oil.

In contrast, for the same strontium-modified lead zirconate titanate which is air-fired, but not re-fired in an oxygen deficient atmosphere, the poling temperature could not be above 150–160° C. and the poling field was substantially 15 kv./cm.

This high temperature poling technique of the present invention, with a poling field of about 10 kv./cm., is applicable to relatively thick discs of the alkaline earth-modified lead zirconate titanate. The electrical breakdown field of lead zirconate titanate decreases as the thickness of the material increases. In the past, it was not possible to pole thick bodies of this material because the poling field needed to attain substantially complete polarization exceeded the breakdown field of the unit. The use of a low intensity poling field of the order of 10 kv./cm., which is made possible by the high temperature during poling, extends considerably the maximum thickness of these units which may be poled.

Lead zirconate titanate, modified by the addition of one or more of the alkaline earth metals, strontium, calcium and barium, has the known advantageous characteristics of high coupling, high dielectric constant (K), and comparatively little change in its losses and its dielectric and mechanical parameters from low A.C. excitation field levels to high levels, compared to previously available materials. This is true for air-fired alkaline earth-modified lead zirconate titanate, and the subsequent re-firing of the ceramic in an oxygen-deficient atmosphere, such as nitrogen gas or argon gas, does not substantially impair these properties.

In both the chromium-modified lead zirconate titanate and the alkaline earth-modified lead zirconate titanate, the improved resistivity provided by the present invention is believed to be intimately related to the mechanisms responsible for conductivity in the ceramic. The ceramic is a p-type semiconductor in which the carriers of electric current are positive holes (electron defects). These holes are generated by vacancies in the cation position present in excess in the air-fired ceramic. The heating of the ceramic in an oxygen-deficient atmosphere is believed to eliminate cation vacancies, thereby making the ceramic more nearly an intrinsic semiconductor, the intrinsic condition being that of lowest conductivity.

In the case of the chromium addition to lead zirconate titanate, it is believed that chromium enters the lead zirconate titanate lattice with more than one valency. The presence of chromium in a plus 6 valency is believed to result in cation vacancies which, in turn, apparently produce easier switching (domain reorientation) and hence lower linearity and greater hysteresis and losses under high excitation field. It is believed that the novel treatment of the present invention converts the chromium from a plus 6 valency to a plus 3 valency, and that the latter valency tends to suppress cation vacancies and improve the linearity.

While certain presently-preferred examples of the present invention have been disclosed in detail and a particular theoretical explanation has been advanced, it is to be understood that the invention is susceptible of embodiments other than those specifically described and that the invention is not limited by the particular theoretical explanation advanced.

We claim:

1. A method of preparing a lead zirconate titanate ferroelectric ceramic material which comprises heating the material at a ceramic firing temperature and at the same time maintaining in the immediate vicinity of the material an oxygen-deficient atmosphere consisting essentially of an unreactive gas selected from the group consisting of nitrogen and argon.

2. A method of preparing a ferroelectric ceramic material having $PbZrO_3$ and $PbTiO_3$ as its principal constituents which comprises firing the material and during said firing maintatining in immediate proximity to the material an oxygen-deficient atmosphere consisting essentially of an unreactive gas selected from the group consisting of nitrogen and argon.

3. A method of preparing a ferroelectric ceramic material composed principally of lead zirconate titanate which comprises re-firing a previously air-fired body of said material in an oxygen-deficient atmosphere consisting essentially of an unreactive gas selected from the group consisting of nitrogen and argon.

4. A method of producing a body of lead zirconate titanate ferroelectric ceramic material, containing chromium as a partial substituent for lead, which comprises heating said material at a ceramic firing temperature and at the same time maintaining around said material an oxygen-deficient atmosphere consisting essentially of an unreactive gas selected from the group consisting of nitrogen and argon.

5. A method of preparing a ferroelectric ceramic body which comprises heating lead zirconate titanate having chromium added in an amount corresponding to from substantially 0.3% to 1.0% by weight of $Cr_2O_3$ at a ceramic firing temperature in an oxygen-deficient atmosphere consisting essentially of an unreactive gas selected from the group consisting of nitrogen and argon.

6. The method of claim 5 wherein the chromium is present in an amount corresponding to substantially 0.7% by weight of $Cr_2O_3$ added to the lead zirconate titanate.

7. A method of producing a body of lead titanate ferroelectric ceramic material, containing as a partial substituent for lead an alkaline earth metal selected from the group consisting of strontium, calcium and barium, which comprises heating said material at a ceramic firing temperature and at the same time maintaining around said material an oxygen-deficient atmosphere consisting essentially of an unreactive gas selected from the group consisting of nitrogen and argon.

8. A method of preparing a ferroelectric ceramic body which comprises heating lead zirconate titanate containing as a minor constituent at least one alkaline earth metal selected from the group consisting of strontium, calcium and barium at a ceramic firing temperature in an oxygen-deficient atmosphere consisting essentially of an unreactive gas selected from the group consisting of nitrogen and argon.

9. A method of preparing a polarized ferroelectric body which comprises heating at a ceramic firing temperature in an oxygen-deficient atmosphere consisting essentially of an unreactive gas selected from the group consisting of nitrogen and argon, a lead titanate ferroelectric material containing as a partial substituent for lead at least one alkaline earth metal selected from the group consisting of strontium, calcium and barium, and thereafter poling said material at a temperature in excess of 200° C. and substantially below the Curie point of said material.

10. A method of producing a polarized ferroelectric body which comprises heating strontium-modified lead zirconate titanate material at a ceramic firing temperature in an oxygen-deficient atmosphere consisting essentially of an unreactive gas selected from the group consisting of nitrogen and argon, and thereafter poling said material at a temperature substantially within the range from 210° C. to 240° C. and under a poling field of substantially 10 kv./cm.

References Cited by the Examiner

UNITED STATES PATENTS

| | | | |
|---|---|---|---|
| 2,960,411 | 11/60 | Brajer et al. | 252—62.9 |
| 3,006,857 | 10/61 | Kulcsar | 252—62.9 |
| 3,021,441 | 2/62 | Howatt | 252—62.9 |
| 3,054,606 | 9/62 | Gravley | 252—62.9 |

TOBIAS E. LEVOW, *Primary Examiner.*

MAURICE A. BRINDISI, *Examiner.*